(12) United States Patent
Watai et al.

(10) Patent No.: US 9,857,776 B2
(45) Date of Patent: Jan. 2, 2018

(54) VEHICLE VIBRATION REDUCTION SYSTEM

(75) Inventors: Hirokazu Watai, Tokyo (JP); Kazutomo Murakami, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 14/009,676

(22) PCT Filed: Mar. 13, 2012

(86) PCT No.: PCT/JP2012/001736
§ 371 (c)(1),
(2), (4) Date: Oct. 3, 2013

(87) PCT Pub. No.: WO2012/137418
PCT Pub. Date: Oct. 11, 2012

(65) Prior Publication Data
US 2014/0032044 A1   Jan. 30, 2014

(30) Foreign Application Priority Data
Apr. 5, 2011   (JP) .................. 2011-083612

(51) Int. Cl.
*G05B 13/02*   (2006.01)
*G05B 5/01*   (2006.01)
(Continued)

(52) U.S. Cl.
CPC ............ *G05B 13/02* (2013.01); *F16F 15/002* (2013.01); *F16F 15/005* (2013.01); *G05B 5/01* (2013.01);
(Continued)

(58) Field of Classification Search
CPC ........ G05B 13/02; G05B 13/021; G05B 5/01; F16F 15/005; F16F 15/002; G05D 19/02; B60K 5/12
See application file for complete search history.

(56) References Cited

U.S. PATENT DOCUMENTS 6,324,290 B1 *  11/2001  Murakami et al. ............. 381/92
2005/0139194 A1 *  6/2005  Ikeda ...................... 123/406.55
(Continued)

FOREIGN PATENT DOCUMENTS

EP   1 566 564 A1   8/2005
JP   4-283125 A   10/1992
(Continued)

OTHER PUBLICATIONS

International Search Report for PCT/JP2012/001736 dated May 29, 2012.
(Continued)

*Primary Examiner* — Rami Khatib
*Assistant Examiner* — Jeffrey Boomer
(74) *Attorney, Agent, or Firm* — Sughrue Mion, PLLC

(57) ABSTRACT

A rotational signal of a generation source of a control object is detected and, when a rotational speed (frequency) varies, convergence values of filter coefficients of adaptive filters 33, 34 based on a previous control result corresponding to the frequency stored in a control device 11 are retrieved and set to the adaptive filters 33, 34 as initial values. The adaptive filters 33, 34 are updated by using the initial values of filter coefficients and output a control signal y(t) to an ACM (actuator) 3a. LMS arithmetic units 37, 39 read a reference signal calculated from the rotational signal and an acceleration signal (error signal) e(t) detected by a sensor 9 and carry out processing for updating the filter coefficients of the adaptive filters 33, 34. The adaptive filters 33, 34,
(Continued)

based on updated filter coefficients, output the control signal y(t) to the ACM 3a.

5 Claims, 6 Drawing Sheets

(51) Int. Cl.
    *F16F 15/00*     (2006.01)
    *G05D 19/02*     (2006.01)
    *B60K 5/12*     (2006.01)

(52) U.S. Cl.
    CPC ........... *G05B 13/021* (2013.01); *G05D 19/02* (2013.01); *B60K 5/12* (2013.01)

(56) References Cited

U.S. PATENT DOCUMENTS

| | | | |
|---|---|---|---|
| 2005/0184214 A1* | 8/2005 | Mizushima et al. | 248/638 |
| 2007/0140503 A1* | 6/2007 | Sakamoto et al. | 381/71.4 |
| 2008/0095383 A1* | 4/2008 | Pan et al. | 381/71.11 |
| 2008/0292110 A1* | 11/2008 | Kobayashi et al. | 381/71.4 |
| 2009/0220102 A1* | 9/2009 | Pan et al. | 381/71.11 |
| 2010/0014685 A1* | 1/2010 | Wurm | 381/71.11 |
| 2010/0098263 A1* | 4/2010 | Pan et al. | 381/71.11 |
| 2010/0098265 A1* | 4/2010 | Pan | G10K 11/178 381/94.1 |
| 2010/0121528 A1* | 5/2010 | Suzuki et al. | 701/36 |
| 2011/0025348 A1* | 2/2011 | Chetham | A61B 5/053 324/649 |
| 2011/0026723 A1* | 2/2011 | Inoue | G10K 11/178 381/71.4 |
| 2011/0280410 A1* | 11/2011 | Matono | G10K 11/1782 381/71.1 |
| 2012/0070013 A1* | 3/2012 | Vau | G10K 11/178 381/71.4 |

FOREIGN PATENT DOCUMENTS

| | | |
|---|---|---|
| JP | 8-44377 A | 2/1996 |
| JP | 8-272376 A | 10/1996 |
| JP | 09-250409 A | 9/1997 |
| JP | 2002-155985 A | 5/2002 |
| JP | 2006-161921 A | 6/2006 |
| JP | 2009-275822 A | 11/2009 |
| JP | 2010-114554 A | 5/2010 |

OTHER PUBLICATIONS

Extended European Search Report issued in European Application No. 12768227.6 dated Sep. 22, 2014.

Chinese Office Action, dated Oct. 10, 2014, issued in corresponding Chinese Patent Application No. 201280017522.1.

Communication dated Nov. 11, 2014, issued by the Japanese Patent Office in counterpart Japanese application No. 2013-508734.

Communication dated Apr. 16, 2015 from the State Intellectual Property Office of People's Republic of China in counterpart Application No. 201280017522.1.

* cited by examiner

FIG. 3

| fk(Hz) | real | imag |
|---|---|---|
| f0 | Cr(f0) | Ci(f0) |
| f1 | Cr(f1) | Ci(f1) |
| f2 | Cr(f2) | Ci(f2) |
| f3 | Cr(f3) | Ci(f3) |
| ⋮ | ⋮ | ⋮ |
| fk | Cr(fk) | Ci(fk) |

FIG. 4

| fk(Hz) | real | imag |
|---|---|---|
| f0 | Wr(f0) | Wi(f0) |
| f1 | Wr(f1) | Wi(f1) |
| f2 | Wr(f2) | Wi(f2) |
| f3 | Wr(f3) | Wi(f3) |
| ⋮ | ⋮ | ⋮ |
| fk | Wr(fk) | Wi(fk) |

# VEHICLE VIBRATION REDUCTION SYSTEM

TECHNICAL FIELD

The present invention relates to a vibration reduction system for reducing vibration at a predetermined position in a vehicle.

BACKGROUND ART

In general, adaptive control techniques using an adaptive digital filter have been widely used for the purpose of reducing vibration and noise, and many techniques including Filtered-X LMS (Least Mean Square) and the like have been proposed. For a structure of an adaptive filter, also, various structures including an FIR (Finite Impulse Response) filter and a SAN (Single-frequency Adaptive Notch) filter have been proposed.

Among them, for adaptive control targeting a periodic signal of engine vibration of an automobile, in terms of an improvement in a control operation amount and a filter convergence, a technique to configure the adaptive digital filter by using the SAN filter has been mainly popularly used.

Further, Patent Document 1 proposes an active vibration suppressing device which, by driving an electromagnetic actuator upon adaptive control aiming at a position where vibration is detected and having a maximum control deviation, suppresses vibration at the position. Further, various methods of the adaptive control have been proposed (for example, see Patent Document 2).

RELATED ART DOCUMENTS

Patent Documents

Patent Document 1: Japanese Patent Laid-Open No. 2002-155985
Patent Document 2: Japanese Patent Laid-Open No. H8-44377

SUMMARY OF INVENTION

Technical Problem

In a control process using the SAN filter, since a coefficient of the adaptive digital filter is updated according to a certain law, engine vibration as a control object takes the minimum value at the time when the filter converges while the control is functioning well. However, filter convergence requires some time.

Further, in a process of adaptive control, considering variation in a frequency of generated engine vibration, i.e., variation in a rotational speed, typical methods reset the filter coefficients to 0 at that time and re-start updating the filter coefficient at the frequency.

That is, since the filter coefficient is reset to 0 each time the rotational speed (frequency) varies, a time for filter convergence is required each time the frequency varies. Therefore, considering an operating state of the vehicle, for example, it is difficult to obtain a good followability to all of various manners to press an accelerator.

An object of the present invention, in consideration of such a problem related to the filter convergence as described above, is to provide a vehicle vibration reduction system capable of improving high-speed control.

Solution to Problem

In order to achieve the above object, according to a first aspect of the present invention, a vehicle vibration reduction system including: at least one excitation device for generating an excitation force; at least one vibration detection device for detecting vibration at a predetermined position in the vehicle; and a control device that calculates a frequency from a rotational speed signal of a generation source of a control object, generates a cosine wave and a sine wave (reference signals) whose frequencies are a real number multiples of a basic frequency of the rotational speed signal, updates an adaptive filter based on a signal obtained from the vibration detection device and a signal (filtered signal) obtained by multiplying the reference signal by transmission characteristics from the excitation device to the vibration detection device and, by using the reference signal and the adaptive filter, controls the excitation device to generate the excitation force, such that the vibration generated at the predetermined position in the vehicle is reduced, wherein the control device, when the rotational speed at the generation source of the control object varies, sets a value of the adaptive filter of a previous control result corresponding to the frequency to the adaptive filter as a initial value and, by using the adaptive filter updated from the initial value, controls the excitation device to generate the excitation force, such that the vibration generated at the predetermined position in the vehicle is reduced.

A second aspect of the present invention is characterized in that, according to the first invention, the control device, among values of the adaptive filter of previous control results stored for each frequency, overwrites the value of the adaptive filter of the previous control result corresponding to the frequency with a value of the updated adaptive filter.

Effect of the Invention

According to the first aspect of the present invention, when the frequency of a control object desired to reduce varies, data of filter coefficients preliminarily stored are given as the initial value, without resetting the initial value of the adaptive filter to 0, and the coefficients are updated in an order from one closer to a convergence value (optimal solution). Therefore, a time to reach the convergence value (optimal solution) of the filter may be shortened and high-speed control may be improved.

According to the second aspect of the present invention, regardless of age-related deterioration of the excitation device and change of an environment of usage (temperature and the like) of the excitation device, the coefficients are always updated in the order from the one closer to the convergence value (optimal solution) under a current environment. Therefore, the time to reach the convergence value (optimal solution) of the filter is shortened and the high-speed control may be improved and, further, robustness of the control may be maintained.

BRIEF DESCRIPTION OF DRAWINGS

FIG. 3 is a diagram illustrating estimated transfer characteristics of each frequency stored in a control device;

FIG. 4 is a diagram illustrating convergence values of adaptive filter coefficients for each frequency stored in the control device;

DESCRIPTION OF EMBODIMENT

Figure 1:
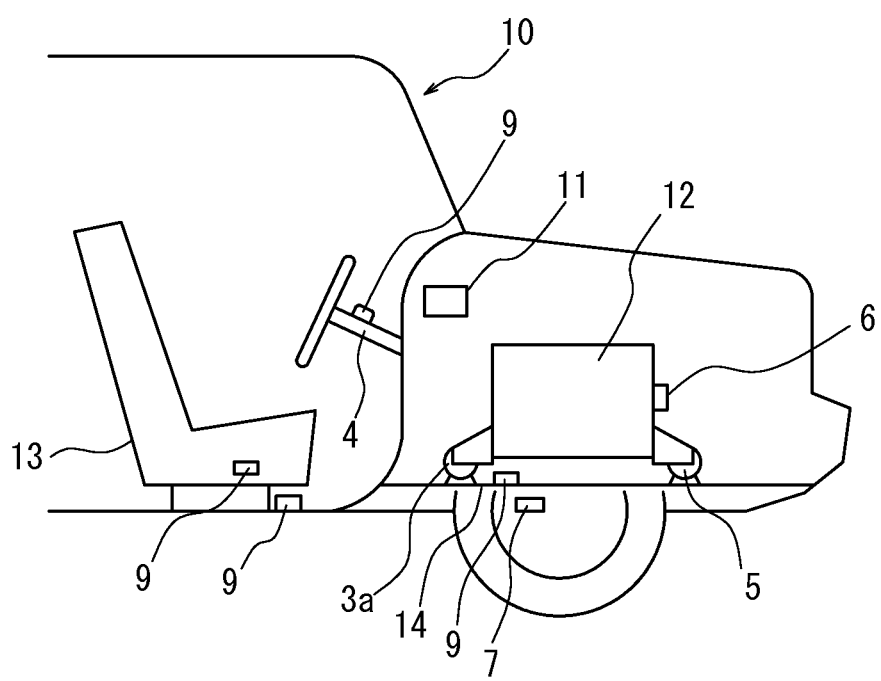
FIG. 1 is a schematic diagram illustrating an embodiment of a vehicle vibration reduction system according to the present invention.

An embodiment of the present invention will be described with reference to the accompanying drawings. FIG. 1 is a schematic diagram illustrating an embodiment of a vehicle vibration reduction system according to the present invention. In FIG. 1, an engine 12 is supported by an active control mount (ACM) 3a having a built-in actuator such as a voice coil, and by a plurality of engine mounts 5. In addition to a function for supporting the engine 12, the ACM 3a has a function as an excitation device to actively generate an excitation force, thereby suppressing vibration at a predetermined position in the vehicle. The engine 12 is provided with a sensor 6 for measuring a rotational speed of a crankshaft of the engine. At the predetermined position in the vehicle, a sensor 9 for detecting vibrations is mounted. At a position in front of a driver's seat (for example, in an instrument panel), a control device 11 for controlling a damping force of the ACM 3a is disposed.

The sensor 9 for detecting vibration functions to detect vibration (for example, acceleration) at the predetermined position in the vehicle in real time, and preferably disposed at a position where occupants feel the vibration highly sensitively or a position near a vibration source (for example, a vehicle body portion of an engine mount). Although the sensor 9 of the example described above is disposed on a steering wheel 4 and a floor portion of a driver's seat, the sensor 9 may be disposed on a seat 13, a vehicle body 14, a headrest portion of a front seat, a floor portion of a rear seat or the like. The sensor 9 may be, for example, an acceleration sensor, a load sensor or the like.

The control device 11 may be located anywhere in the vehicle.

Figure 2:
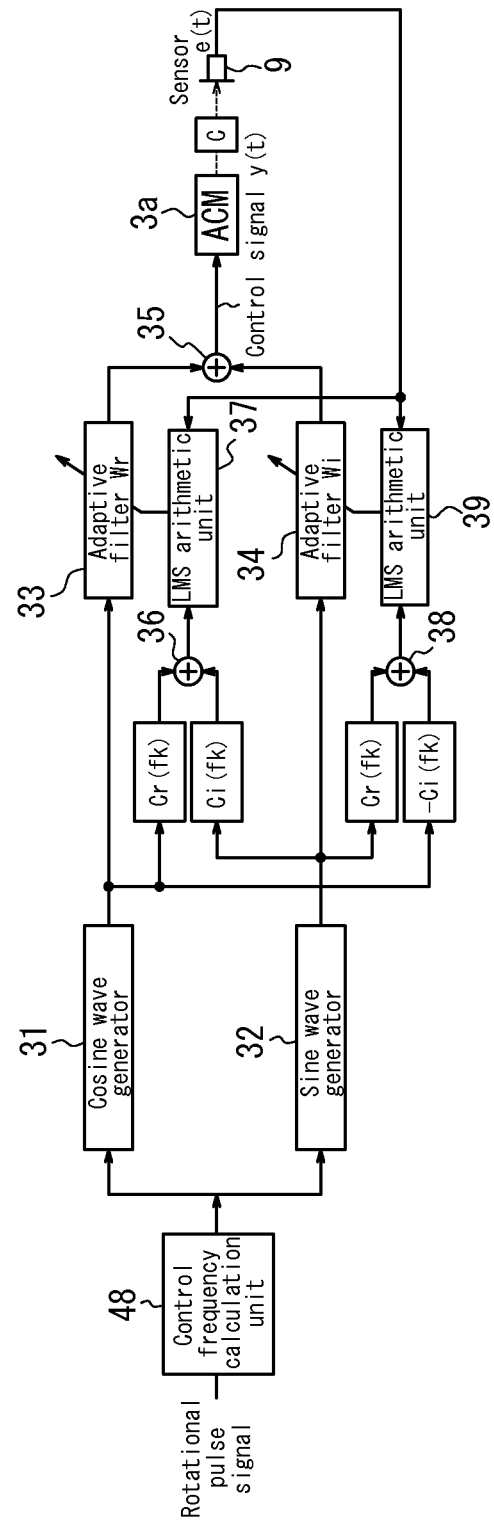
FIG. 2 is a block diagram illustrating a control system according to the embodiment of the vehicle vibration reduction system.

FIG. 2 is a block diagram illustrating a control system according to the embodiment of the vehicle vibration reduction system. The control device 11 includes a control frequency calculation unit 48, a cosine wave generator 31, a sine wave generator 32, an adaptive filter 33, an adaptive filter 34, an adder 35, an adder 36, an LMS arithmetic unit 37, an adder 38, and an LMS arithmetic unit 39.

The control frequency calculation unit 48 calculates a frequency for control from a rotational pulse signal of the crankshaft output from the sensor 6. The cosine wave generator 31 generates a cosine wave at a frequency calculated by the control frequency calculation unit 48. The sine wave generator 32 generates a sine wave at the frequency calculated by the control frequency calculation unit 48. The adaptive filter 33 adjusts a gain of the cosine wave (reference signal) output from the cosine wave generator 31. The adaptive filter 34 adjusts a gain of the sine wave (reference signal) output from the sine wave generator 32. The adder 35, by adding a control signal from the adaptive filter 33 and a control signal from the adaptive filter 34, outputs a control signal y(t) to the ACM (actuator) 3a. The adder 36 adds a signal obtained by multiplying the reference signal from the cosine wave generator 31 by transfer characteristics from the ACM (actuator) 3a to the sensor 9 and a signal obtained by multiplying the reference signal from the sine wave generator 32 by the transfer characteristics from the ACM (actuator) 3a to the sensor 9. The LMS arithmetic unit 37 reads an output of the adder 36 and an acceleration signal (error signal) e(t) detected by the sensor 9 and updates a filter coefficient of the adaptive filter 33. The adder 38 adds the signal obtained by multiplying the reference signal from the cosine wave generator 31 by the transfer characteristics from the ACM (actuator) 3a to the sensor 9 and the signal obtained by multiplying the reference signal from the sine wave generator 32 by the transfer characteristics from the ACM (actuator) 3a to the sensor 9. The LMS arithmetic unit 39 reads an output of the adder 38 and the acceleration signal (error signal) e(t) detected by the sensor 9 and updates a filter coefficient of the adaptive filter 34.

In FIG. 2, C represents actual transfer characteristics from the ACM 3a to the sensor 9. Cr (fk) and Ci (fk) represent estimated transfer characteristics from the ACM 3a to the sensor 9 at each control frequency fk. When a response of the sensor 9 at the time of excitation of the ACM3a is expressed by a sum of a sine component and a cosine component at the frequency fk, the Cr (fk) and the Ci (fk) represent a coefficient of the cosine component and a coefficient of the sine component, respectively. The control device 11 preliminarily obtains the Cr (fk) and the Ci (fk) at each control frequency fk and, as illustrated in FIG. 3, stores them for each frequency.

The control unit 11 stores convergence values of the filter coefficients of the adaptive filters 33, 34 obtained for each frequency in previous adaptive controls, as illustrated in FIG. 4. Although in FIG. 4 the controller 11 stores each one of Wr (fk) and Wi (fk) for each frequency, in consideration of variations in the optimal solution based on a driving state (an engine load state and the like based on slow acceleration, sudden acceleration and different road surface conditions), the Wr (fk) and the Wi (fk) for a plurality of different driving states may be preliminarily obtained and stored, such that Wr (fk) and Wi (fk) for a corresponding driving state at each time may be retrieved.

Figure 5:
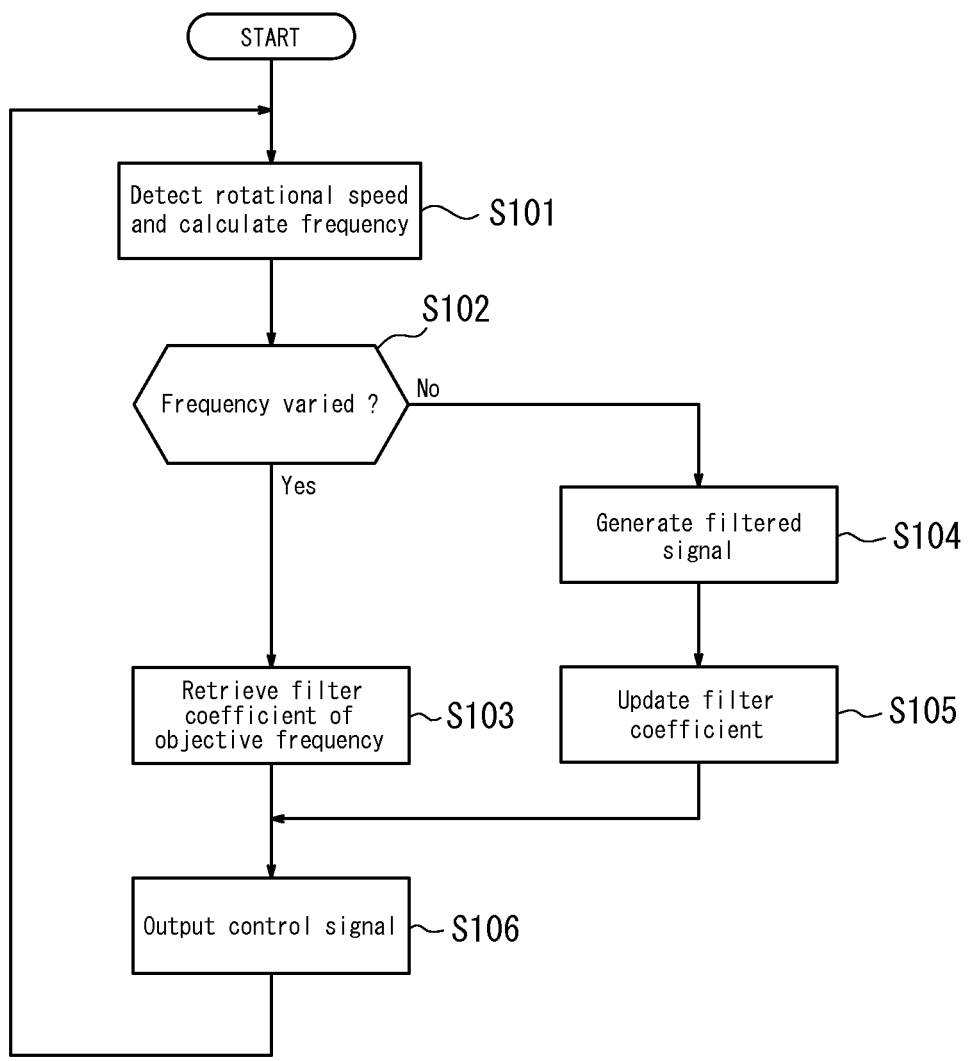
FIG. 5 is a flowchart illustrating an operation of the present invention.

FIG. 5 is a flowchart illustrating an operation of the vibration reduction system according to the present invention. In the control device 11, the control frequency calculation unit 48 detects a rotational speed at a generation source of a control object and calculates a frequency from a rotational speed signal (S101). Next, the control device 11 determines whether the frequency (rotational speed) has been varied (S102). When the frequency has been varied (Yes), the control device 11 retrieves the convergence value Wr (fk) of the filter coefficient of the adaptive filter 33 and the convergence value Wi (fk) of the filter coefficient of the adaptive filter 34 based on a previous control result corresponding to the frequency stored in the control device 11, and sets the values to the adaptive filters 33 as initial values, 34 (S103). Then, in the control device 11, the cosine wave generator 31 generates a cosine wave at a basic frequency and a cosine wave at a frequency which is a real number multiple of the basic frequency, and the adaptive filter 33, by using the initial value of the filter coefficient described above, adjusts a gain of the reference signal output from the cosine wave generator 31. In the control device 11, also, the sine wave generator 32 generates a sine wave at the basic frequency and a sine wave at a frequency which is a real number multiple of the basic frequency, and the adaptive filter 34, by using the initial value of the filter coefficient described above, adjusts a gain of the reference signal output from the sine wave generator 32. Next, in the control device 11, the adder 35 adds the control signal from the adaptive filter 33 and the control signal from the adaptive filter 34 and output the control signal y(t) to the ACM (actuator) 3*a* (S106).

Next, in the control device 11, the adder 36 adds (creates a filtered signal from) a signal obtained by multiplying the reference signal from the cosine wave generator 31 by the Cr (fk) at the control frequency fk and a signal obtained by multiplying the reference signal from the sine wave generator 32 by the Ci (fk) at the control frequency fk (S104). In the control device 11, the LMS arithmetic unit 37 reads an output signal from the adder 36 and the acceleration signal (error signal) e(t) detected by the sensor 9 and carries out processing for updating the filter coefficient of the adaptive filter 33 (S105). In the control device 11, the adder 38 adds (creates the filtered signal from) the signal obtained by multiplying the reference signal from the cosine wave generator 31 by the Cr (fk) at the control frequency fk and the signal obtained by multiplying the reference signal from the sine wave generator 32 by a −Ci (fk) at the control frequency fk (S104). In the control device 11, the LMS arithmetic unit 39 reads an output from the adder 38 and the acceleration signal (error signal) e(t) detected by the sensor 9 and carries out processing for updating the filter coefficients of the adaptive filter 34 (S105).

The adaptive filters 33, 34, based on updated filter coefficients, output the control signal y(t) to the ACM 3*a* (S106).

According to the present invention, the operation described above is repeated and, when a frequency of a control object desired to reduce varies, data of the filter coefficients preliminarily stored (data created based on previous control results) are given as the initial value without resetting the initial value of the adaptive filter to 0, thereby updating the filter coefficient from the initial value. According to the present invention, since the initial value of the filter coefficient is substantially a convergence value and the filter coefficients are updated in an order from one closer to the convergence value, a time to reach the filter convergence value (optimal solution) is shortened and high-speed of control may be significantly improved.

Figure 6:
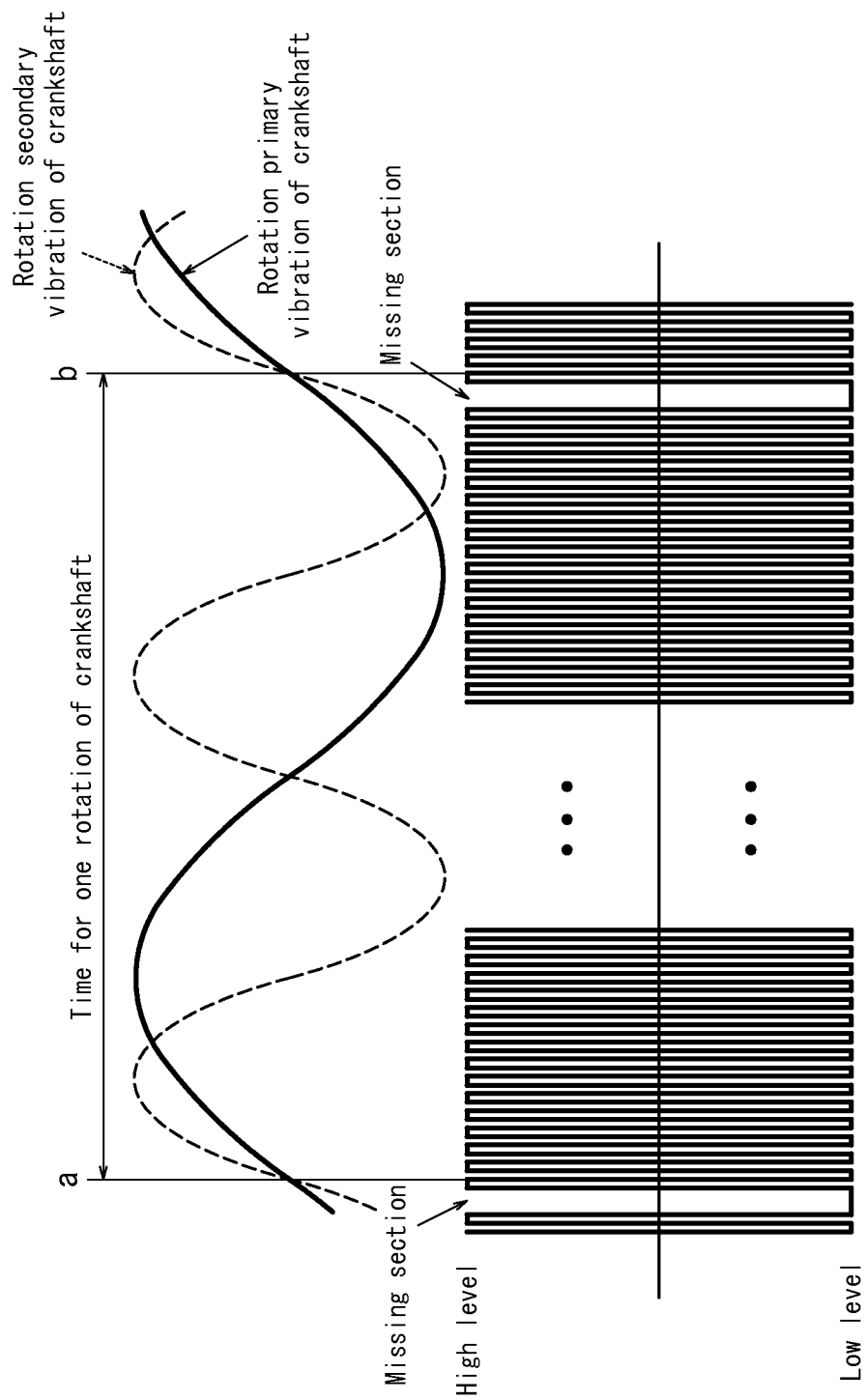
FIG. 6 is a diagram illustrating a relationship between a rotational pulse signal of a crankshaft and waveforms of rotation primary vibration and rotation secondary vibration of the crankshaft.

Next, a method for determining an origin of the cosine wave and the sine wave to be used when the cosine wave generator 31 generates the cosine wave and the sine wave generator 32 generates the sine wave will be described. FIG. 6 is a diagram illustrating a relationship between the rotational pulse signal of the crankshaft and waveforms of rotation primary vibration of the crankshaft and rotation secondary vibration of the crankshaft. A rotational pulse signal illustrated in FIG. 6 is a pulse signal having a missing section used for detection of a crank angle of the crankshaft and the like.

In FIG. 6, since the crank angle are at the same positions at positions a and b, these positions are set as origins (a point where amplitude of the sine wave becomes 0 or where amplitude of the cosine wave becomes 1) of the cosine wave generated by the cosine wave generator 31 and the sine wave generated by the sine wave generator 32. The origins are determined on the basis of a missing position of the rotational pulse signal of the crankshaft.

The missing position is a position determined to be, for example, (last High-level period)×2<(Low-level period). In the example illustrated in FIG. 6, a point when a first falling edge of the pulse signal after a determined missing section (missing period) is set as the origin. When a sampling frequency is sufficiently high, a point when a rising edge of the pulse signal is detected may be set as the origin.

The filter coefficients of the adaptive filters stored in the control device 11 are the filter coefficients on the basis of the origin. According to the present invention, therefore, by determining the origin of the sine wave and the cosine wave by the above method, for example, the high-speed control may be obtained by using the filter coefficients stored in the control device 11.

It is appreciated that, other than the determination method of the origin described above, such as when the rotational pulse signal of the crankshaft has no missing section, a reference point of the crankshaft (the origin of the sine wave and the cosine wave) may be determined by using an ignition pulse signal or a signal for detecting a position of TDC (Top Dead Center) of a specific cylinder.

Further, for an engine having an odd number of cylinders such as a three-cylinder engine, vibration and noise of a half-order such as 1.5th is a main concern. However, when the origin is obtained from the rotational pulse signal of the crankshaft alone and the control described above is carried out, the control object may be reduced or excited, depending on the timing to start the control.

This is because, for the engine with an odd number of cylinders, a vibration direction of the control object at a crank angle position used as the origin by the above method is not uniquely determined, and such a case occurs when the vibration direction at the origin position at the start of a current control is opposite to the vibration direction at the origin position at the start of a previous control.

However, even in such a case, by using, for example, another signal such as the ignition pulse signal of the cylinder or the signal for detecting the TDC position described above in combination with the rotational pulse signal of the crankshaft, the origin and the vibration direction at the position may be uniquely determined, whereby the suggested control method may be applied.

In FIG. 4, since the Wr (fk) and the Wi (fk) stored for each frequency may possibly deviate from a current optimal solution due to age-related deterioration of the excitation device and change of an environment of usage (temperature and the like), the present invention may have a function to update the stored value with a convergence value of the latest control result.

Figure 7:
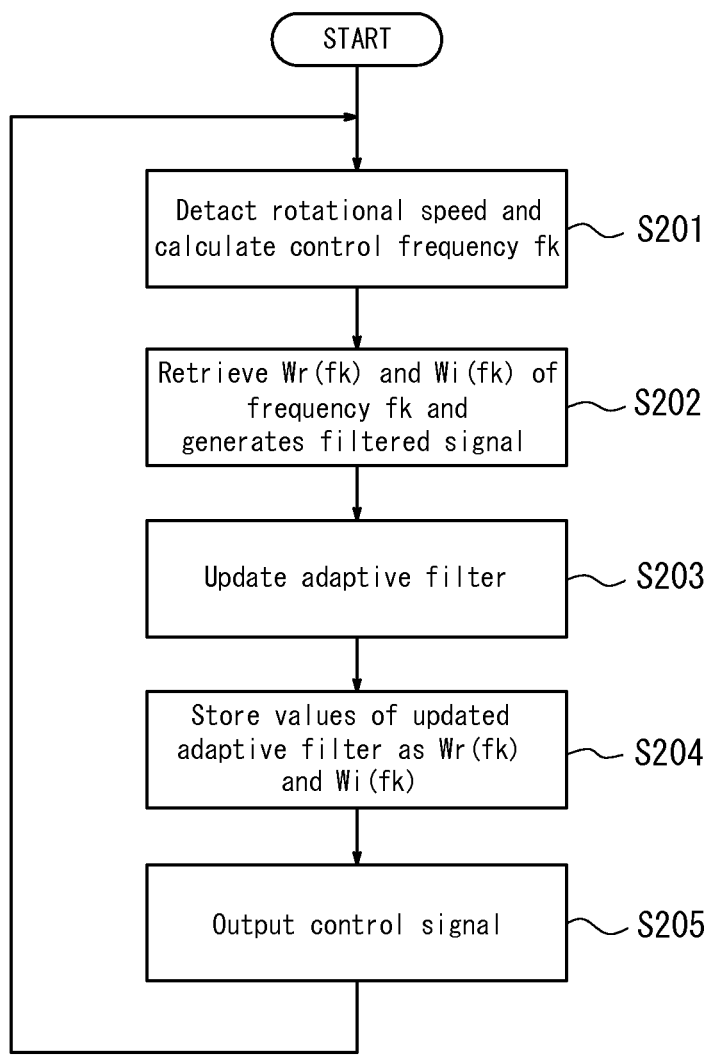
FIG. 7 is a flowchart illustrating an operation when updating the convergence value of the adaptive filter coefficient for each frequency stored in the control device.

FIG. 7 is a flowchart illustrating an operation for updating the convergence value of the adaptive filter coefficient for each frequency stored in the control device. FIG. 7 illustrates an embodiment in which the values of the adaptive filters 33, 34 updated at each time are stored as the Wr (fk) and the Wi (fk) at the frequency fk at that time, as needed.

The control device 11, at a sample time n, detects the rotational speed of the generation source of the control object and calculates the frequency fk from the rotational speed signal (S201). Next, the control device 11 retrieves the convergence values Wr (fk) and Wi (fk) of the filter coefficients of the adaptive filter corresponding to the frequency fk stored in the control device 11, sets the values to the adaptive filters as the initial values and, in a manner similar to S104 illustrated in FIG. 5, generates the filtered signal (S202). Next, the control device 11, in a manner similar to S105 illustrated in FIG. 5, reads the filtered signal and an acceleration signal (error signal) e(n) detected by the sensor 9 and carries out the processing for updating the filter coefficients of the adaptive filter (S203). The control device 11, after updating the adaptive filters, overwrites the Wr (fk) and the Wi (fk) with updated values of the adaptive filters (S204). The adaptive filter, based on the updated filter coefficients, outputs a control signal y(n) to the ACM 3a (S205). The control device 11, further, at sample time n+1, repeats the process described above, retrieves stored Wr (fk) and Wi (fk) and updates the adaptive filters.

By repeating the above processing, the Wr (fk) and the Wi (fk) stored for each frequency continue to be constantly updated as optimum values in current environment of usage. According to the present invention, the process for detecting variation in the frequency illustrated in FIG. 5 may be omitted.

When there are a plurality of control frequencies, for example, when a plurality of harmonics of a fundamental frequency determined from the rotational signal such as a rotational secondary component and a rotational forth component of a four-cylinder engine, the control frequency calculation unit 48 according to the present invention having a function capable of calculating a plurality of frequencies to be controlled calculates the fundamental frequency determined from the rotational signal and a frequency which is a real number multiple of the fundamental frequency. Then, the cosine wave generator 31 and the sine wave generator 32 may generate a cosine wave and a sine wave, respectively, at a selected frequency.

Incidentally, since vibration generated in the vehicle are synthesized in various phases and there is a possibility that vibrations at frequencies of 0.5 times and 1.5 times may increase, the cosine wave generator 31 and the sine wave generator 32 of the present invention generate sine waves and cosine waves at a set frequency and at a frequency which is a real number multiple of the set frequency. According to the present invention, parallel operations are required for the number of frequencies desired to reduce.

Also, although in the embodiment described above vibration is reduced by one ACM and one vibration detection sensor, the present invention is applicable also when there are two or more ACMs and/or vibration detection sensors.

Also, the excitation device is not limited to the ACM but may be an active mass damper (Active Mass Damper) or of a torque rod type. A mounting position of the excitation device is not limited to an engine bottom but may be between a suspension device and a vehicle body. According to the present invention, by mounting the excitation device between the suspension device and the vehicle body, for example, vibration caused by rotation of tires may be efficiently reduced.

Moreover, the present invention is applicable for reducing sounds, as well as for reducing vibration. In such a case, the present invention has a speaker for reducing the sound in place of the excitation device, and a noise detection device microphone such as a microphone in place of a vibration detection device.

Further, although in the embodiment described above the processing for updating the filter coefficient of the adaptive filter is carried out by using an LMS algorithm, it is appreciated that the processing for updating the filter coefficient may be carried out by using various algorithms such as complex LMS algorithm (Complex Least Mean Square Algorithm), Normalized LMS algorithm (Normalized Least Mean Square Algorithm), projection algorithm (Projection Algorithm), SHARF algorithm (Simple Hyperstable Adaptive Recursive Filter Algorithm), RLS algorithm (Recursive Least Square Algorithm), FLMS algorithm (Fast Least Mean Square Algorithm), an adaptive filter using DCT (Adaptive Filter using Discrete Cosine Transform), SAN filter (Single Frequency Adaptive Notch Filter), neural network (Neural Network), genetic algorithm (Genetic Algorithm) and the like.

REFERENCE SIGNS LIST

3a ACM
4 steering wheel
6 sensor
7 sensor
9 sensor
10 vehicle
11 control device
12 engine
13 seat
14 vehicle body
31 cosine wave generator
32 sine wave generator
33, 34 adaptive filter
35, 36, 38 adder
37, 39 LMS arithmetic unit
48 control frequency calculation unit

The invention claimed is:

1. A vehicle vibration reduction system comprising:
at least one excitation device comprising an actuator configured to generate an excitation force;
at least one sensor configured to detect vibration at a predetermined position in the vehicle; and
a controller configured to calculate a rotational speed of a generation source of a control object from a rotational speed signal of the generation source, generate a reference signal whose frequency is equal to a value of a real number multiple of the rotational speed of the generation source, update an adaptive filter based on a signal obtained from the vibration detection device and a filtered signal obtained by multiplying a cosine component and a sine component of the reference signal respectively by estimated transfer characteristics from the excitation device to the vibration detection device at the rotation speed of the generation source, and, by using the adaptive filter, control the excitation device to generate the excitation force, such that the vibration generated at the predetermined position in the vehicle is reduced, wherein
the controller is configured to, when the rotational speed at the generation source of the control object varies, set a value of the adaptive filter of a previous control result corresponding to the rotational speed of the generation source to the adaptive filter as an initial value and, by using the adaptive filter updated from the initial value, control the excitation device to generate the excitation force, such that the vibration generated at the predetermined position in the vehicle is reduced.

2. The vehicle vibration reduction system according to claim 1, wherein the controller is configured to store values of the adaptive filter of previous control results for each rotational speed and overwrites one of the values of the adaptive filter of the previous control result corresponding to the rotational speed of the generation source with a value of the updated adaptive filter.

3. The vehicle vibration reduction system according to claim 1, wherein the adaptive filter comprises a SAN filter.

4. The vehicle vibration reduction system according to claim 1, wherein the controller is configured to store the estimated transfer characteristics from the excitation device to the vibration detection device for each rotational speed.

5. The vehicle vibration reduction system according to claim 1, wherein the reference signal is a rotational pulse signal having a gap in a rectangular pulse.

\* \* \* \* \*